May 18, 1926.
M. O. CLAUSS
1,584,846
CLUTCH MECHANISM
Original Filed July 25, 1919
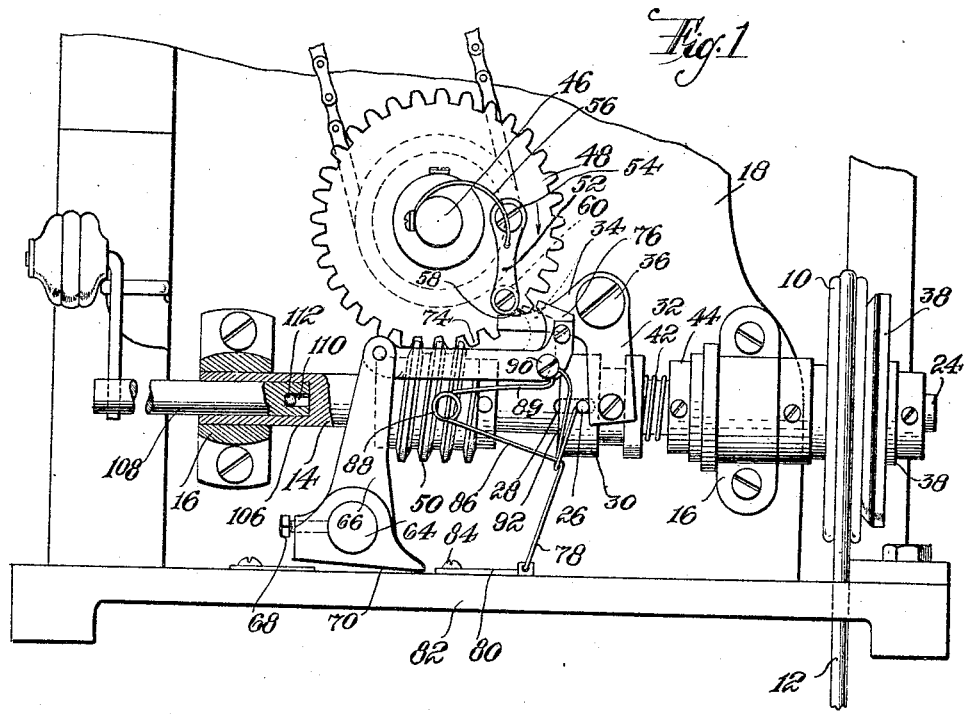
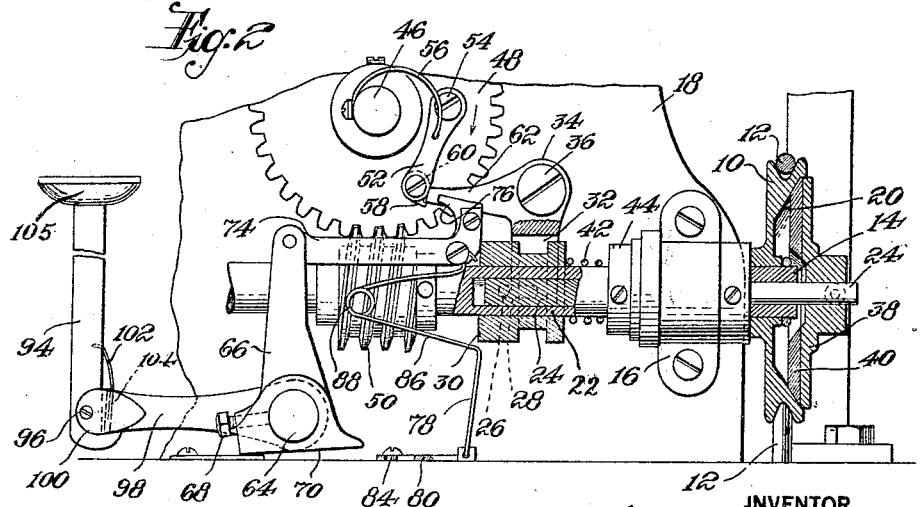

Patented May 18, 1926.

1,584,846

UNITED STATES PATENT OFFICE.

MAX O. CLAUSS, OF NEW YORK, N. Y.

CLUTCH MECHANISM.

Original application filed July 25, 1919, Serial No. 313,415. Divided and this application filed February 13, 1922. Serial No. 536,378.

This invention relates to clutch mechanism, and more particularly to clutch mechanism of the type adapted to stop a machine after the performance of a single operation or a predetermined number of operations by the machine.

This application is a division of my application, Serial No. 313,415, filed July 25, 1919, for label attaching machines, and the clutch mechanism hereinafter described is especially intended to be used for controlling the operation of label attaching machines or the like. It is recognized, however, that the invention is not restricted in its use to such machines, and it is accordingly intended that the scope of the invention shall not be limited except as is required by the claims.

An object of the invention is to provide a clutch mechanism in the use of which the starting and stopping of the driven member will be very quick and reliable, and which is simple in construction so that it may be very cheaply manufactured and it is not likely to get out of order.

To this end an important feature of the invention consists in the provision of a driving element and a driven member adapted to be operatively connected together, and a part mounted on and movable relatively to the driven member and operable to disconnect said member from the driving element.

Preferably, and in the illustrated construction, the starting of the movement of the driven member is effected by manually controlled means operable to move said part with relation to the driven member, and a further feature of the invention resides in the provision of novel means for manually operating said part.

Further objects and features of the invention will appear as the description proceeds, and will be pointed out in the appended claims.

In the drawings in which like reference characters designate identical parts in the various views:

Fig. 1 is a view in side elevation of a clutch mechanism constructed in accordance with the invention and applied to a label attaching machine, certain of the parts of the clutch mechanism being shown in section, and Fig. 2 is also a view in side elevation but showing other parts in section, and showing the parts in a different position from Fig. 1.

In the illustrated construction, the primary driving element 10 is in the form of a belt wheel which is driven from a motor or other suitable source of power by a driving belt indicated at 12. This element is loosely mounted upon a driven shaft 14, which is journaled in suitable bearings 16 fixed to the frame plate 18 of the label attaching machine, and is provided with an annular beveled friction face 20. The shaft 14 is formed with a tubular portion 22 to accommodate a reciprocatory clutch actuating rod 24. A transversely disposed pin 26 fixed in this rod is shiftable in the slots 28 formed in the tubular section of the shaft 14. The extremities of this pin are fixed in a collar 30 loosely surrounding the shaft 14, and with this collar the bifurcated arm 32 of a bell crank lever 34 is operatively engaged. This lever is fulcrumed at 36 upon the frame plate 18.

To the end of the rod 24, projecting beyond the end of the shaft 14, a clutch disk 38 is fixed, said disk being faced with leather or other suitable friction material 40 for engagement with the face 20 of the power driven element 10. A coil spring 42 surrounds the shaft 14 and bears at one of its ends against the collar 30 and at its other end against a collar 44 fixed on said shaft.

Upon the main operating shaft 46 of the machine a worm gear 48 is fixed and is operatively engaged by a worm 50 secured on the shaft 14. A tappet member 52 is pivoted at one of its ends as at 54 upon the face of the worm gear 48 and is yieldingly held against pivotal movement in a clockwise direction away from a suitable stop member (not shown) by means of a spring 56. The tappet member 52 is normally positioned as shown in Fig. 1 and has a lip or projection 58 on its free end. After each complete rotation of the worm gear 48 a roller 60 carried by the tappet member 52 strikes upon the laterally extending arm 62 of the bell crank lever 34 and oscillates said lever on its fulcrum, as shown in Fig. 1, to thereby move the collar 30 on the shaft 14 against the action of the spring 42 and thus axially shift the rod 24 within the tubular portion of said shaft to move the clutch disk 38 away from the clutch face 20 of the power element 10. In this manner, the transmission of rotation to the worm 50 is discontinued and the machine promptly brought to a stop.

Manually operable means is provided for releasing the tappet member 52 from engagement with the clutch shifting lever 34, so that the worm gear 48 and shaft 46 may be again rotated. This releasing means includes a rock shaft 64 journaled in the frame 18 and having an upwardly extending arm 66 fixed to one of its ends by means of a set screw 68. The lower end of the arm 66 is enlarged and provided with a flat elongated bottom face 70 so arranged as to limit the rocking movement of the shaft. A coil spring (not shown) surrounding the rock shaft yieldingly holds the shaft against rotation in one direction and tends to retain the parts in their normal positions, as seen in Fig. 1. To the upper end of the arm 66 a lever 74 is pivotally connected at one of its ends, the other end of said lever being upwardly curved and having a dog 76 fixed thereto. In order to support this lever for horizontal rectilinear movement so that the dog 76 will properly strike the lip 58 on the tappet member 52, I provide a yieldingly supporting element of peculiar construction. This member acting as a support is formed from a single length of spring wire designated generally by 78, said wire at one of its ends being hingedly connected to a slotted plate 80 which is longitudinally adjustable upon the bed plate 82 and may be secured in its adjusted position by a set screw 84. This wire is bent to provide a laterally projecting portion 86 at the end of which one or more spring coils 88 are formed in the wire. From the spring coils 88 the wire is extended in divergent relation to the part 86 thereof, as shown at 89, and is bent around the shank of a screw 90, which is threaded in the lever 74. From this screw the wire extends downwardly and has a hook or bend 92 formed therein within which the portion 86 of the wire is received. It will thus be seen that the spring coils 88 tend to urge the free end of the lever 74 upwardly while the terminal hook 92 in the spring wire limits such upward movement of the lever. When the shaft 64 is actuated to move the arm 66 towards the left from the position shown in Fig. 1, the spring support will move as a unit owing to its hinged connection to the plate 80. By adjusting the plate 80 upon the bed plate 82 the free end of the lever 74 may be adjusted and raised or lowered so as to properly position the dog 76. This dog striking upon the lip 58, as shown in dotted lines in Fig. 1, will move the free lower end of the tappet member 52 to the left with respect to the lever arm 62, and when the tappet member has been moved far enough to carry the vertical diameter of the roll 60 beyond the end of the lever arm 62, the spring 42 immediately acts against the collar 30 to move the clutch disk 38 into effective driving engagement with the power element 10 and to raise the lever 62, thus completing the movement of the roll 60 out of engagement with the upper face of the arm. The parts are then in the position shown in Fig. 2. Rotation is then imparted to the shaft 14 and through the worm 50 and worm gear 48 to the shaft 46. In the rotation of the worm gear 48, the tappet member 52 is carried around the shaft 46, and at the end of a full cycle of rotation of the worm gear 48 is again brought downwardly on the arm 62 of the bell crank lever 34, as shown in Fig 1, to throw out the clutch elements and discontinue the rotation of the shaft 46.

While any preferred means may be adapted for manually actuating the rock shaft 64, I have provided for this purpose a vertically disposed lever 94 pivoted as at 96 in the bifurcated end of an arm 98, which is fixed on the end of the rock shaft 64. The lever is formed at its lower end with a laterally projecting lug 100 normally held in engagement with the lower edge of the arm 98 by means of a spring 102, one end of which is engaged in a groove 104 formed in the end of the arm 98, while the other end of said spring is fixed to the lever 94. At its upper end this lever is equipped with a suitable head 105 constructed to be grasped by the hand.

The shaft 14 has an additional tubular end portion 106 in which one end of a manually operable crank 108 is adapted to be inserted. At its extremity this end of the crank is provided with a notch or recess 110 to receive a pin 112 extending transversely through the tubular section of the shaft. This detachable crank is employed for initially setting the mechanism, after which it is detached and the operation of the machine continued by means of the motor or other power.

Having fully described the invention, what is claimed is:

1. A mechanism of the character described comprising a driven member, a power actuated driving member, a clutch mechanism for operatively connecting said members with each other including a spring held shiftable part, a pivoted lever engaged with said clutch part, and an element carried by said driving member and adapted to coact with said lever to shift said clutch part in one direction and disconnect the driving member from the driven member.

2. A mechanism of the character described comprising a driven member, a power actuated driving member, a clutch mechanism for operatively connecting said members with each other including a spring held shiftable part, a pivoted lever engaged with said clutch part, an element pivoted at one of its ends upon said driving member, and a spring yieldingly holding said element in a normal position for engagement at its other end with said lever to shift the clutch part in one direction and disconnect the driving member from the driven member.

3. A mechanism of the character described comprising a driven member, a driving member, a clutch mechanism for operatively connecting said members with each other including a spring held shiftable clutch part, a pivotally mounted lever engaged at one of its ends with said shiftable clutch part, and a spring held pivoted element carried by the driving member and adapted to engage the other end of said lever to actuate the same and shift the clutch part in one direction to disconnect the driving member from the driven member.

4. A mechanism of the character described comprising a driven member, a driving member, a clutch mechanism including a spring held shiftable clutch part, a lever pivotally mounted intermediate of its ends and having one end engaged with said shiftable clutch part, and an element carried by said driving member and adapted to engage the other end of said lever to actuate the same and shift the clutch part to disconnect the driving member from the driven member.

5. A mechanism of the character described comprising a driven member, a driving member, a clutch for operatively connecting said members with each other including a spring held shiftable clutch part, an L-shaped lever lever pivotally mounted intermediate of its ends and having one arm thereof engaged with said shiftable clutch part, and a spring held element mounted upon the driving member adapted to engage the other arm of said lever to actuate the same and shift the clutch part to disconnect the driving member from the driven member.

6. Mechanism for controlling the operation of label attaching machines and the like, including a driven member, a power actuated driving element rotatable relatively to the driven member, an operating member actuated by the driven member, clutch means for operatively connecting the driven member to the driving element, means normally acting to maintain such connection, and means for destroying the driving connection, consisting of a part operatively connected to one of the clutch elements and an actuator carried by said operating member and movable relatively thereto, adapted to co-act with said part at the end of each cycle of movement of the operating member, a manually operable rock shaft, a member pivotally connected at one of its ends to said shaft, and a yieldable supporting element connected to the other end of said member and sustaining the same in operative relation to the actuator to engage the latter upon a rocking movement of the shaft in one direction and thereby move the actuator out of engagement with said part to again establish the driving connection.

7. Mechanism for controlling the operation of label attaching machines and the like, including a driven member, a power actuated driving element rotatable relatively to the driven member, an operating member actuated by the driven member, clutch means for operatively connecting the driven member to the driving element, means normally acting to maintain such connection, means for destroying the driving connection, consisting of a part operatively connected to one of the clutch elements and an actuator carried by said operating member and movable relatively thereto, adapted to co-act with said part at the end of each cycle of movement of the operating member, a manually operable rock shaft, a member pivotally connected at one of its ends to said shaft, and a resilient sustaining element connected to the other end of said member adjustable with respect to the rock shaft to support said member in position for operative engagement with the actuator upon a rocking movement of the shaft in one direction to thereby disengage the actuator from said part to again establish the driving connection.

8. Mechanism for controlling the operation of label attaching machines and the like, including a driven member, a driving element rotatable relatively to the driven member, an operating member actuated by the driven member, clutch means for operatively connecting the driven member to the driving element, means normally acting to maintain such connection, and means for destroying the driving connection, consisting of a part operatively connected to one of the clutch elements and an actuator carried by said operating member and movable relatively thereto, adapted to co-act with said part at the end of each cycle of movement of the operating member, a manually operable rock shaft, a member pivotally connected at one of its ends to said shaft, a resilient sustaining element connected to the other end of said member, a plate to which said element is hingedly connected, and means for adjusting said plate relative to the rock shaft, said sustaining element directing said member into operative engagement with the actuator upon a rocking movement of said shaft in one direction to disengage the actuator from said part and thereby again establish the driving connection.

9. A mechanism of the character described comprising a driven member, a driving member, a clutch mechanism for operatively connecting said members with each other including a spring held shiftable clutch part, a pivotally mounted lever operatively connected with said clutch part, a spring held element carried by the driving member to coact with said lever and shift the clutch part to disconnect the driving member from the driven member, a manually operable rock shaft, a dog pivotally connected with said rock shaft, and a spring adjustably mounted at one of its ends and having its other end connected with said dog to yieldingly support the latter in position for engagement with said element on the driving member to move the latter out of engagement with said lever and thereby again establish the driving connection.

In testimony that I claim the foregoing as my invention, I have signed my name hereunder.

MAX O. CLAUSS.